United States Patent
Requet

(10) Patent No.: US 7,080,829 B2
(45) Date of Patent: Jul. 25, 2006

(54) DEVICE FOR HOLDING ONE END OF A HELICAL SPRING

(75) Inventor: Claude Requet, Chaucenne (FR)

(73) Assignee: Mantion S.A., Besancon (FR)

( * ) Notice: Subject to any disclaimer, the term of this patent is extended or adjusted under 35 U.S.C. 154(b) by 0 days.

(21) Appl. No.: 10/910,892

(22) Filed: Aug. 4, 2004

(65) Prior Publication Data

US 2005/0035513 A1   Feb. 17, 2005

(30) Foreign Application Priority Data

Aug. 12, 2003   (FR) ................... 03 09870

(51) Int. Cl.
    *F16F 1/06* (2006.01)
    *F16F 1/12* (2006.01)
(52) U.S. Cl. ................... 267/175; 267/177
(58) Field of Classification Search ........... 267/154, 267/155, 166, 167, 170, 172, 173, 174, 175, 267/177, 178, 179, 180, 286, 287, 288, 289, 267/291
    See application file for complete search history.

(56) References Cited

U.S. PATENT DOCUMENTS

| | | | | |
|---|---|---|---|---|
| 247,700 A | * | 9/1881 | Sill | ............ 267/174 |
| 256,281 A | * | 4/1882 | Brown | ............ 267/170 |
| 263,845 A | * | 9/1882 | Brown | ............ 267/174 |
| 2,400,425 A | | 5/1946 | Liber | |
| 2,661,206 A | * | 12/1953 | Gregoire | ............ 267/286 |
| 3,056,597 A | * | 10/1962 | Gutshall | ............ 267/177 |
| 3,163,195 A | * | 12/1964 | Croswell | ............ 267/177 |

FOREIGN PATENT DOCUMENTS

DE      697 877      10/1940
JP      07-293616     3/1996

* cited by examiner

*Primary Examiner*—Thomas J. Williams
(74) *Attorney, Agent, or Firm*—Frommer Lawrence & Haug LLP; Ronald R. Santucci

(57) ABSTRACT

The invention relates to a device for holding one end of a helical spring and adjusting the tension of the spring. It comprises a plate ($P_1$) provided with two series of holes (12, 13) spaced apart by a distance approximately equal to the diameter of the turns of the spring. The holes of one series are offset with respect to those of the other series. The plate (P1) is provided with a gripping and holding device (5, 8). The gripping and holding device comprises a threaded rod (5), one end of which is provided with a holding means (8). The threaded rod (5) engages in a tapped hole (15) integral with said plate ($P_1$). A half-cylindrical wall (11) permits the passage of the threaded rod (5).

4 Claims, 2 Drawing Sheets

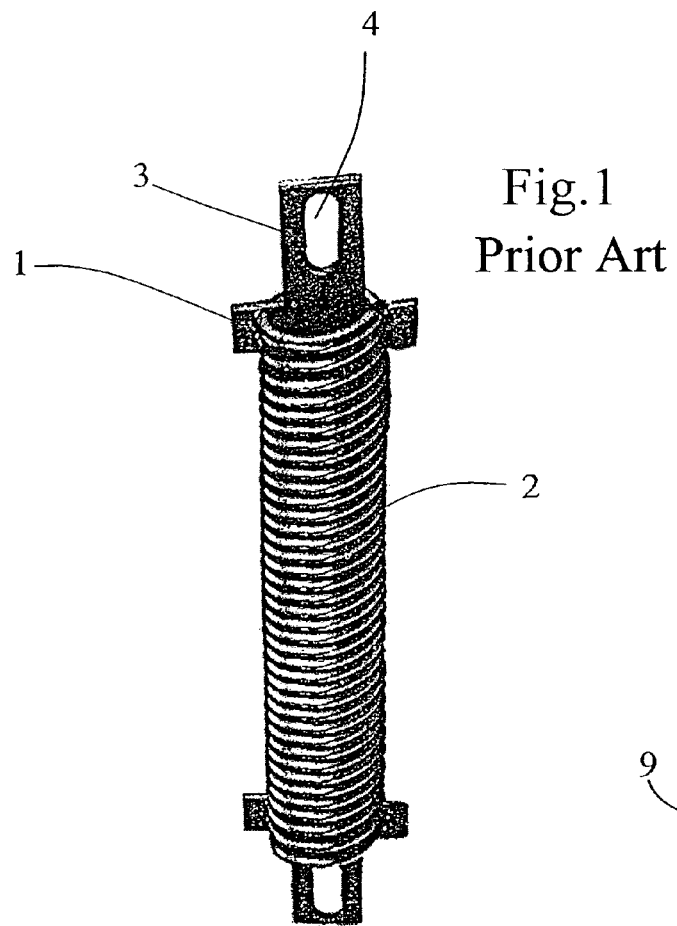
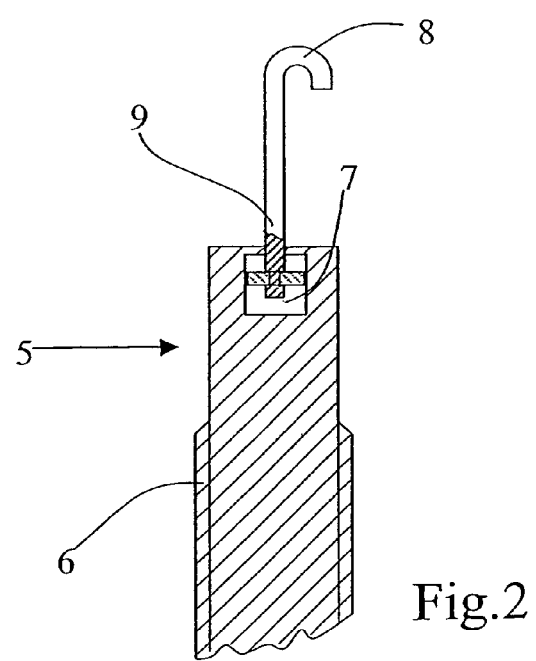

DEVICE FOR HOLDING ONE END OF A HELICAL SPRING

This application claims priority benefits from French Patent Application No. 0309870 filed Aug. 12, 2003.

FIELD OF THE INVENTION

The present invention relates to a device for connecting one end of a helical spring and adjusting the tension of the spring, comprising a plate provided with two series of holes spaced apart by a distance approximately equal to the diameter of the turns of the spring, the holes of one series being offset with respect to those of the other series to allow the progressive engagement of the end turns of the spring in said holes, and the plate being provided with a gripping and holding device

PRIOR ART

Such devices are known and an example is illustrated in FIG. 1. The plate 1 comprises two series of holes in which the end turns of the spring 2 can engage. The plate comprises a part 3 with a hole 4. The part 3 is used to grip the device to fix it to the spring 2, while the hole 4 is used to connect the whole to a hook or the like. To adjust the tension of the spring, the plate is turned, or both are turned, in or out relative to the end turns. This adjustment must be done by disconnecting the plate and the range of adjustment remains limited and imprecise.

Another proposal has been to turn a threaded rod with a thread pitch corresponding to the internal helix of the turns whilst its other end has a holding means. This device has a wider range of possible adjustment and adjustment is relatively precise. The disadvantage is that under tension the turns can slip relative to the thread of the threaded rod and modify the desired adjustment.

It is an object of the present invention to provide a device that mitigates the drawbacks of the known devices.

SUMMARY OF THE INVENTION

The device according to the invention is one in which the gripping and holding device comprises a threaded rod, one end of which is provided with a holding means, said threaded rod engages in a tapped hole integral with said plate and whose axis is parallel to the spring axis, and the plate is configured between the series of holes to permit the passage of said threaded rod.

The advantage of this device is that, by means of the plate, it enables the spring to be held firmly, yet allows a wide range of precise adjustment of spring tension as the threaded rod is engaged more or less in the tapped hole integral with the plate.

In one variant, the plate is provided at one end with a flange perpendicular to the plane of the plate, said flange is provided with a tapped hole, and between the series of holes the plate has a half-cylindrical wall.

In another variant, the plate is provided between the two series of holes with a cylindrical wall containing said tapped hole.

Lastly, the plate can be made up of two complementary stamped sheet-metal parts.

The invention will be described with the help of the accompanying drawing showing two alternative embodiments by way of non-restrictive examples.

DESCRIPTION OF THE DRAWINGS

FIG. 1 shows a spring with a known fixing device described earlier.

FIG. 2 shows a threaded rod in cross section.

DESCRIPTION OF THE PREFERRED EMBODIMENTS

Figure 3:
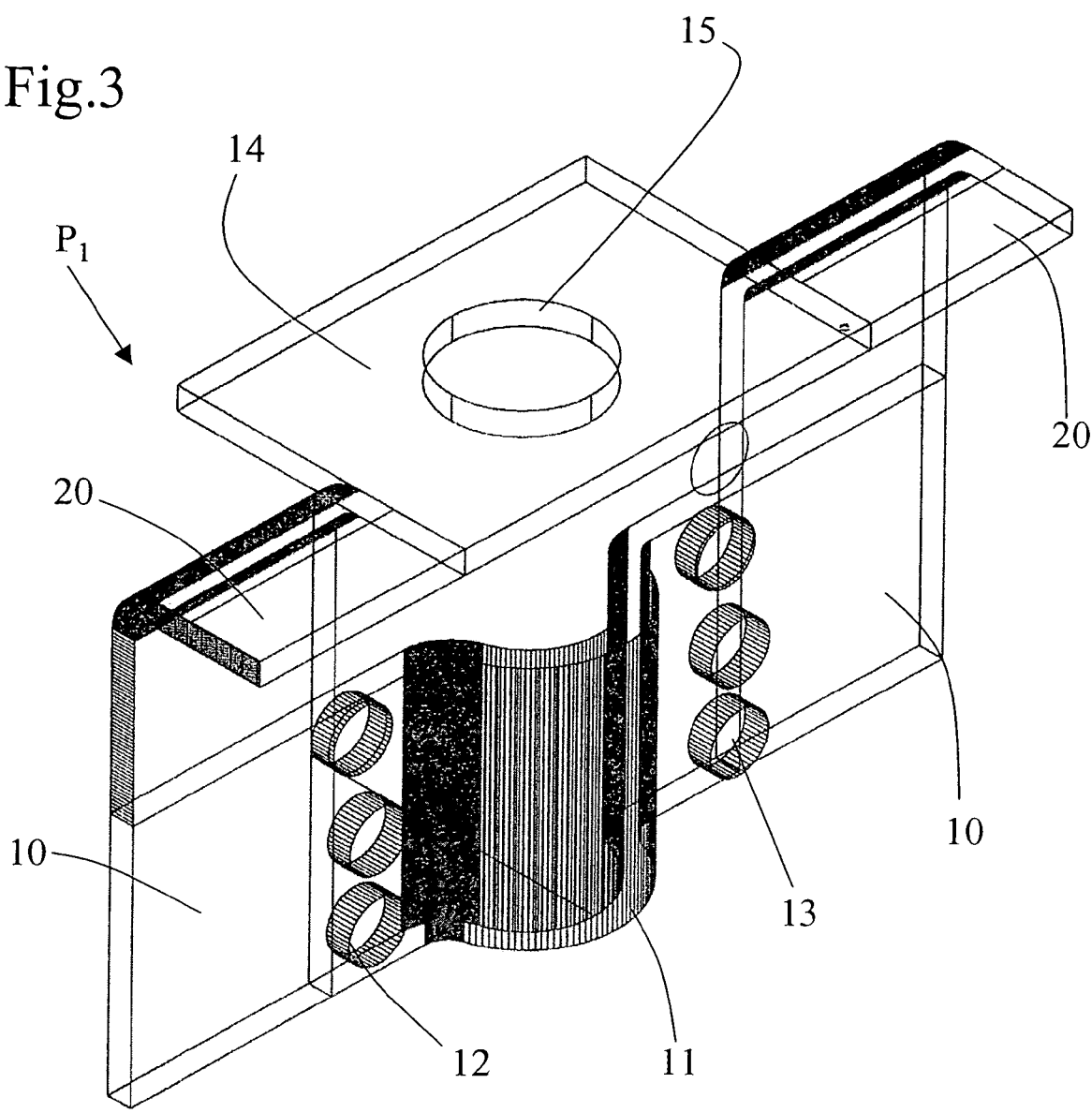
FIG. 3 shows a plate according to the invention in perspective.

FIG. 2 shows a rod 5 having on one part a screw thread 6 and at its upper end a freely rotating hook 8 engaged through a hole 9 in a recess 7 in the rod 5. The end of the hook is trapped in the recess 7 by a circlip or by stamping the end of the hook or any other equivalent means that enables the rod to rotate without it coming out of the element to which it is hooked. An alternative to the hook 8 would be any other means that allows the end of the rod 5 to be connected to another element.

FIG. 3 is a perspective view of an alternative embodiment of the plate $P_1$. It consists of two flat parts 10 connected by a half-cylindrical wall 11. On either side of the half-cylindrical wall 11 are two series of holes 12, 13 with a slight height offset between them. The upper part of the flat parts is bent at 90° in the form of a flange, and a perforated plate 14 is fixed between the two parts 20 to form a continuous plane. The plate 14 is provided with a tapped hole 15 whose axis coincides with or is parallel to the axis of the half-cylindrical wall 11. The rod 5 can be screwed into the tapped hole 15, its lower part meeting without difficulty the cylindrical wall and even passing it as it screws into a spring whose first turns are engaged in the two series of holes 12 and 13 (as in FIG. 1). To adjust the tension of the spring the rod 5 is simply screwed in or out. The other end of the spring can also be provided with the same device to give a larger range of adjustment.

Figure 4:
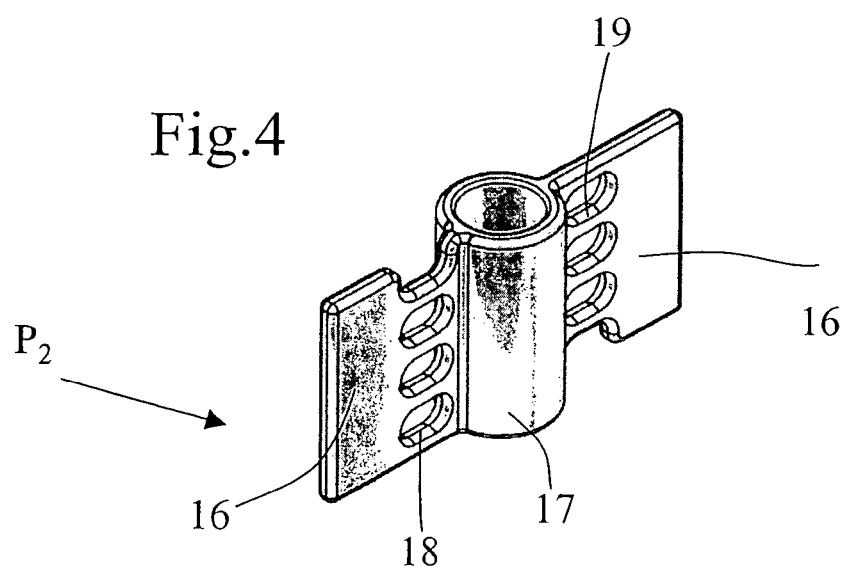
FIG. 4 shows another embodiment of a plate according to the invention in perspective.

FIG. 4 shows an alternative embodiment. The plate $P_2$ is made up of two flat parts 16 extending on either side of a cylindrical part 17 containing a tapped hole. On either side of the cylindrical part 17 are two series of holes 18 and 19, there being a height offset between the holes of one series and those of the other to allow the engagement of the end turns of a spring. The rod 5 can be engaged in the cylindrical part 17 and can screw into the tapped hole. The use of this alternative embodiment is identical to that of FIG. 3.

Plate $P_2$ shown in FIG. 4 is a more compact construction than that in FIG. 3. It can be manufactured by assembling two complementary parts made in stamped sheet metal, each comprising two flat parts joined by a half-cylindrical wall.

The invention claimed is:

1. A device for holding one end of a helical spring and adjusting the tension of the spring, comprising a plate (1; $P_1$; $P_2$) provided with two series of holes (12, 13; 18, 19) spaced apart by a distance approximately equal to the diameter of the turns of the spring (2), the holes of one series being offset with respect to those of the other series to allow the progressive engagement of the end turns of the spring in said holes, and the plate being provided with a gripping and holding device (5, 8), in which the gripping and holding device comprises a threaded rod (5), one end of which is provided with a holding means (8), said threaded rod (5) threadingly engages in a tapped hole (15; 17) integral with said plate ($P_1$; $P_2$) and whose axis is parallel to the spring axis, wherein said threaded rod (5) is screwed in or out of said plate ($P_1$; $P_2$) thereby adjusting the tension on said spring. and the plate is configured (11; 17) between the series of holes (12, 13; 18, 19) to permit the passage of said threaded rod (5).

2. The device as claimed in claim 1, in which the plate ($P_1$) is provided at one end with a flange (20, 14) perpendicular to the plane of the plate, said flange (14) is provided with a tapped hole (15), and between the series of holes (12, 13) the plate has a half-cylindrical wall (11).

3. The device as claimed in claim 1, in which the plate ($P_2$) is provided between the two series of holes (18, 19) with a cylindrical wall (17) containing said tapped hole.

4. The device as claimed in claim 3, in which the plate ($P_2$) is formed by two complementary stamped sheet-metal parts.

\* \* \* \* \*